United States Patent
Alperovich et al.

(10) Patent No.: US 6,728,215 B1
(45) Date of Patent: Apr. 27, 2004

(54) SYSTEM AND METHOD FOR PLACING WIRELESS CALLS ON AN INTERNET PROTOCOL BASED LOCAL AREA NETWORK BASED UPON QUALITY OF SERVICE CONDITIONS

(75) Inventors: Vladimir Alperovich, Dallas, TX (US); Ranjit Bhatia, Dallas, TX (US)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/224,215

(22) Filed: Dec. 30, 1998

(51) Int. Cl.[7] .................................................. H04Q 7/08
(52) U.S. Cl. ........................................ 370/252; 370/338
(58) Field of Search ................................ 370/252, 328, 370/329, 338, 347, 352, 353, 400, 401, 447, 448, 449, 229, 230, 231, 232, 233, 234, 235, 236, 468; 455/509, 512

(56) References Cited

U.S. PATENT DOCUMENTS

| | | | | |
|---|---|---|---|---|
| 5,475,689 A | * | 12/1995 | Kay et al. ................. | 370/95.3 |
| 5,729,542 A | * | 3/1998 | Dupont ....................... | 370/346 |
| 5,752,193 A | * | 5/1998 | Scholefield et al. ........ | 455/452 |
| 5,781,536 A | * | 7/1998 | Ahmadi et al. .............. | 370/252 |
| 6,112,101 A | * | 8/2000 | Bhatia et al. ................ | 455/512 |
| 6,243,581 B1 | * | 6/2001 | Jawanda ...................... | 455/432 |
| 6,400,946 B1 | * | 6/2002 | Vazvan et al. ............... | 455/432 |

* cited by examiner

*Primary Examiner*—Steven H. D Nguyen
*Assistant Examiner*—Duc Duong (57) ABSTRACT

A telecommunications system and method is disclosed for allowing a mobile station to determine whether or not to place a wireless call through an internet protocol (IP) based local area network (LAN) based upon broadcasted Quality of Service (QOS) information. The gatekeeper within the IP based LAN has access to the QOS information and periodically sends the QOS to the base station controller (BSC) functionality within the access node (AN) of the IP based LAN. The BSC functionality then transmits the QOS parameter on the System Information message via the base transceiver station (BTS) to the mobile stations served by the BTS. The mobile stations receive this QOS information and use this QOS information to decide upon a transport method to complete outgoing wireless calls.

23 Claims, 7 Drawing Sheets

SYSTEM AND METHOD FOR PLACING WIRELESS CALLS ON AN INTERNET PROTOCOL BASED LOCAL AREA NETWORK BASED UPON QUALITY OF SERVICE CONDITIONS

BACKGROUND OF THE PRESENT INVENTION

1. Field of the Invention

The present invention relates generally to telecommunications systems and methods for placing wireless calls within a local area network based wireless telecommunications system using internet protocol routing procedures, and specifically to placing wireless calls within a local area network based wireless telecommunications system based upon the quality of service.

2. Background and Objects of the Present Invention

The first, Local Area Networks (LANs) were proprietary and developed to support unintelligent user workstations in which a primary station controlled the operations of the attached devices (secondary stations). The effectiveness of this technology decreased because the master/slave protocol was too slow and cumbersome. Therefore, new types of LANs were developed, such as Ethernet LANs and token-ring LANs. Ethernet LANs and token-ring LANs are designed for data applications and use a shared medium (bus or ring, respectively) designed for 10 Mbit/s speeds and up to Gigabit speeds.

However, during periods of high activity, the shared medium does not respond well to all users, which results in degraded response time and throughput. Therefore, Switched Ethernet LANs were developed to provide more capacity to the end users. Switched Ethernet does not rely on sharing the media. Instead, Switched Ethernet provides point-to-point bandwidth between the user station and a switch. Another type of LAN being developed alongside Switched Ethernet is the Asynchronous Transfer Mode (ATM) based LAN, which utilizes very high-speed ATM switches that support multimedia applications.

On top of these different networking architectures, such as Switched Ethernet or ATM, which define the physical attributes of the communications network, many LANs have begun using Internet Protocol (IP) to route data between hosts on the network. The data is routed in datagrams and is transmitted using connection-less network services. Therefore, IP does not guarantee the reliable delivery of the data or the sequencing of the datagram. Hence, an upper layer, such as Transmission Control Protocol (TCP) or User Datagram Protocol (UDP), must provide this function. TCP connection-oriented services provide reliable delivery of data between the host computers by establishing a connection before the applications send data. Thus, TCP guarantees that the data is error free and in sequence. On the other hand, UDP connection-oriented services are used by various applications to send messages where the integrity of the data is not as important.

Data can be sent across a LAN from an originating host computer to a receiving host computer using the IP routing protocol by encapsulating the data sent by the originating host computer into an IP datagram, which includes an IP header. The IP header identifies the address of the receiving host computer. The IP datagram and header can then be further encapsulated into the specific protocol of the transit network, such as an Ethernet LAN, for delivery of the IP datagram and header to an IP router.

After the transit network has delivered the IP datagram and header to the IP router, the IP router strips away the control information and uses the destination address in the datagram header to determine where to route the traffic. Typically, the IP router then passes the datagram back to the sub-network by invoking a sub-network access protocol, such as Ethernet on the LAN. This protocol is used to encapsulate the datagram header and user data into the headers and trailers that are used by the sub-network to deliver the data to the receiving host computer. It should be understood that routers can also be used to transport data to other LANs.

Figure 1:
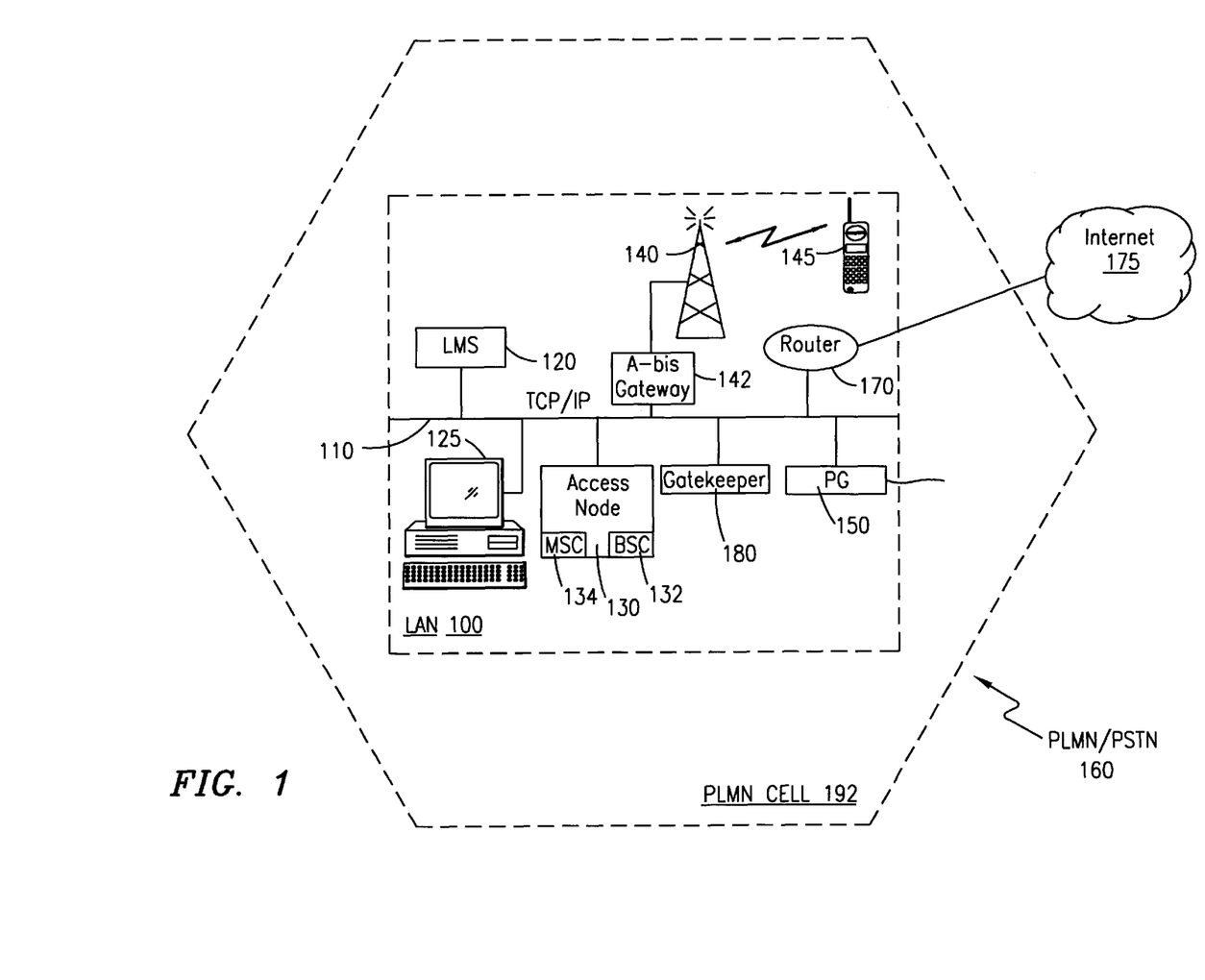
FIG. 1 is a block diagram of a conventional internet protocol based local area network that provides mobile communications.

LANs not only interconnect computers for data communications, but can also interconnect mobile terminals for voice communications. This convergence of voice and data communications has allowed voice traffic to be sent over IP-based networks, which has, in turn, increased the total amount of traffic over these IP-based networks. For example, FIG. 1 depicts the implementation of a mobile communications system into a LAN 100. The mobile communications system includes an Access Node (AN) 130, which combines a Mobile Switching Center (MSC) functionality 134 for controlling calls made to and from Mobile Stations (MSs) 145 within the LAN 100 and a Base Station Controller (BSC) functionality 132 for controlling radio-related functions, such as channel assignment. The mobile communications system also includes at least one Base Transceiver Station (BTS) 140, which operates as a tranceiver for transmitting and receiving voice and control messages to and from the MSs 145, and an associated A-bis Gateway 142, which converts between circuit-switched signaling used by the BTS 140 and packet-switched signaling used by the LAN 100. The AN 130 and A-bis gateway 142 are connected to the LAN 100 through an LAN backbone 110.

The LAN 100 is managed through an LAN management system (LMS) 120 such as Tivoli or other similar system, which monitors the traffic and load on the LAN backbone 110. A gatekeeper 180 allocates bandwidth for all hosts, e.g., computers 125 and BTSs 140, on the LAN backbone 110 using, for example, the H.323 protocol. It should be noted that the LMS 120 can be included within the gatekeeper 180.

Wireless voice communications are transported through the LAN backbone 110 between BTSs 140 or between a BTS 140 and a Public Gateway (PG) 150 via UDP/IP. The PG 150 provides the interconnection between the packet based LAN 100 and the circuit switched public telephone network, e.g., Public Switched Telephone Network (PSTN) and Public Land Telephone Network (PLMN) 160. In many cases, a PLMN cell 192 overlaps the LAN 100. Speech and data are transmitted within the LAN 100 and through the Internet 175 using an IP Router 170.

In the IP based LAN wireless system 100, the BTSs 140 and the Access node 130 communicate with each other through the LAN backbone 110. In addition, the LAN backbone 110 is used by all other hosts 125, e.g., computers, in the network 100 to send and receive data communications between each other and through the Internet 175 via the IP Router 170. Therefore, when the LAN backbone 110 becomes congested, which can occur, for example, when a computer host 125 is downloading a large file, voice packets sent via the unreliable UDP can be lost, resulting in a decline in speech quality, and thus, poor Quality of Service (QOS) to MSs 145 sending and receiving the voice packets.

It is, therefore, an object of the present invention to broadcast QOS information based upon the congestion within the LAN to mobile stations within the LAN.

It is a further object of the present invention for mobile stations to use the QOS information in deciding whether to place a call on the IP based LAN.

It is still a further object of the present invention to allow mobile stations to complete calls on the traditional PLMN network or on another LAN when the QOS on the IP based LAN serving the mobile stations is poor.

SUMMARY OF THE INVENTION

The present invention is directed to telecommunications systems and methods for allowing a mobile station to determine whether or not to place a wireless call through an IP based LAN based upon broadcasted QOS information. The gatekeeper has access to the QOS information from the IP based LAN and periodically sends the QOS to the BSC functionality within the AN through the MSC functionality within the AN. The BSC functionality then transmits the QOS parameter on the System Information message via the BTS to the MSs served by the BTS. The MSs receive this QOS information and use this QOS information to decide upon a transport method to complete outgoing wireless calls, such as through the IP based LAN, through the PLMN or through another IP based LAN. Advantageously, by allowing MSs to decide whether to place calls on the IP based LAN based upon QOS information, the load on the IP based LAN can be reduced and adequate speech quality can be maintained. In addition, the IP based LAN can use this QOS information to differentiate charging for wireless calls.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 2:
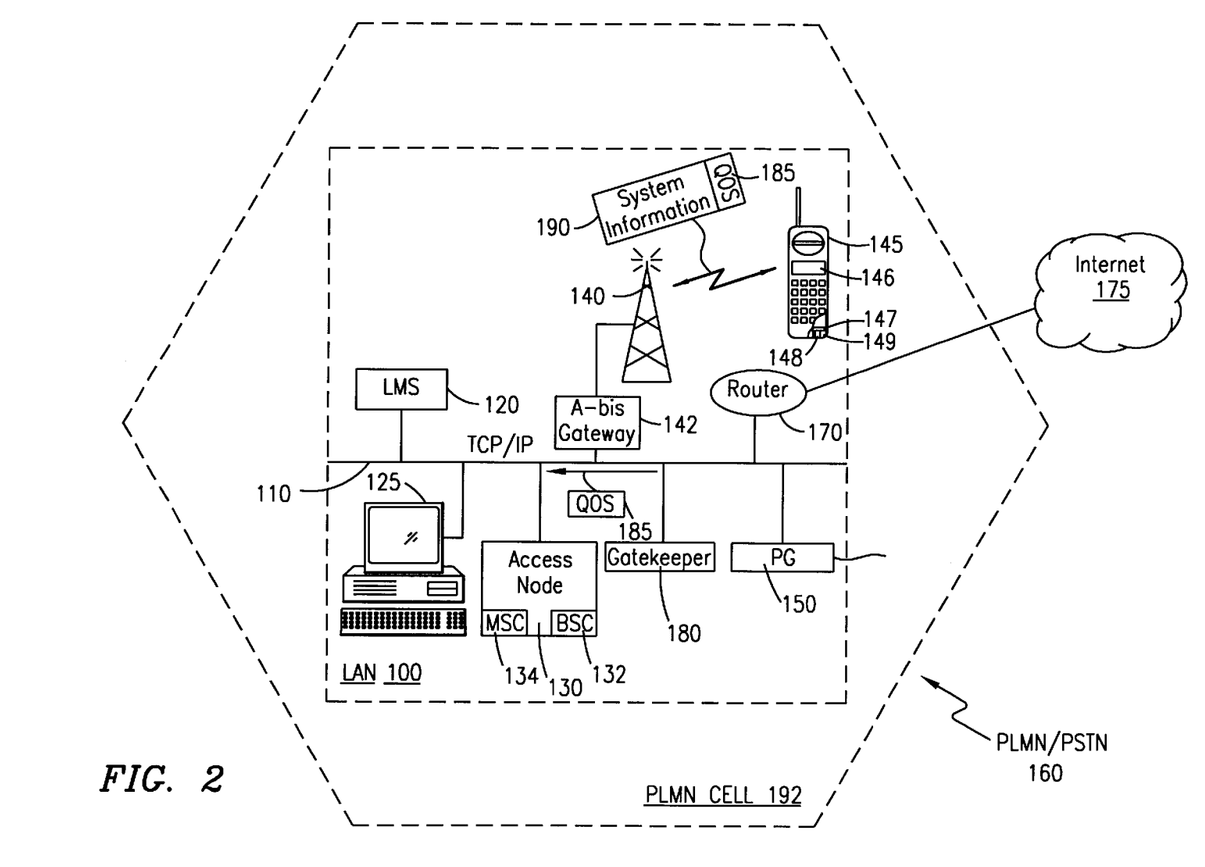
FIG. 2 illustrates the determination by a mobile station of whether or not to place an outgoing wireless call on an internet protocol based local area network based upon broadcasted quality of service information in accordance with preferred embodiments of the present invention.

With reference now to FIG. 2 of the drawings, an internet protocol (IP) based local area network (LAN) 100 is shown in which a Mobile Station (MS) 145 can determine whether to place a call over the IP based LAN 100 based upon Quality of Service (QOS) information 185 broadcast to the MS 145. The traffic and load on the LAN backbone 110 due to voice and data communications is monitored by an LAN management system (LMS) 120. The host computers 125, Access Node (AN) 130, which is a combined Mobile Switching Center (MSC) functionality 134 and Base Station Controller (BSC) functionality 132, and Base Transceiver Stations (BTSs) 140 are all connected to the LAN backbone 110. It should be understood that the BTSs 140 are connected to the LAN backbone 110 through associated A-bis Gateways 142. When an MS 145 in wireless communication with one of the BTSs 140 makes or receives a call, the speech is transported through the LAN backbone 110 to another BTS (if the calling or called party is another MS in wireless communication with another BTS connected to the LAN backbone 110) or to a Public Gateway (PG) 150, which provides the interconnection between the packet based LAN 100 and circuit switched public telephone network (if the calling or called party is within the PSTN/PLMN 160). The speech is routed through the LAN backbone 110 using User Datagram Protocol (UDP) over IP. Speech is not routed using the more reliable Transmission Control Protocol (TCP) over IP. Speech and data are transmitted to the nodes 125 and 140 within the LAN 100 and through the Internet 175 using the IP Router 170.

A gatekeeper 180 within the IP based LAN 100 is responsible for allocating bandwidth to requesting hosts 125 and 140 within the IP based LAN 100. Based upon the amount of bandwidth allocated, the gatekeeper 180 can determine the QOS information 185. The QOS information 185 typically reflects the amount of congestion on the network 110. For example, if the gatekeeper 180 has allocated 30 percent of the available bandwidth, the QOS 185 would be 30. In one embodiment of the present invention, the gatekeeper 180 periodically sends the QOS information 185 to the BSC functionality 132 within the AN 130 through the MSC functionality 134 within the AN 130. The BSC functionality 132 can then transmit the QOS parameter 185 to the MS 145 on a System Information message 190 via the BTS 140.

The MS 145 receives the QOS parameter 185 and uses this QOS information 185 to decide upon a transport method to complete outgoing wireless calls. For example, the mobile subscriber can store a QOS threshold value 148 within a memory 147, such as a Subscriber Identity Module (SIM) card, within the MS 145. When the MS 145 receives the broadcasted QOS 185, a comparison application 149 within the MS 145 (shown within the memory 147 of the MS 145), can compare the broadcasted QOS 185 with the stored QOS threshold value 148. If the broadcasted QOS 185 exceeds the stored QOS threshold 148, when the mobile subscriber attempts to place a wireless call, the comparison application 149 can either instruct the MS 145 to display both the results of the comparison and a prompt message requesting instructions for completing the call to the mobile subscriber on a display 146 of the MS 145 or instruct the MS 145 to place the call over either a PLMN cell 192 within the PLMN network 160 or another LAN based network (not shown), depending upon the stored preference of the mobile subscriber and whether the PLMN 160 and/or another LAN based network is available.

Figure 3:
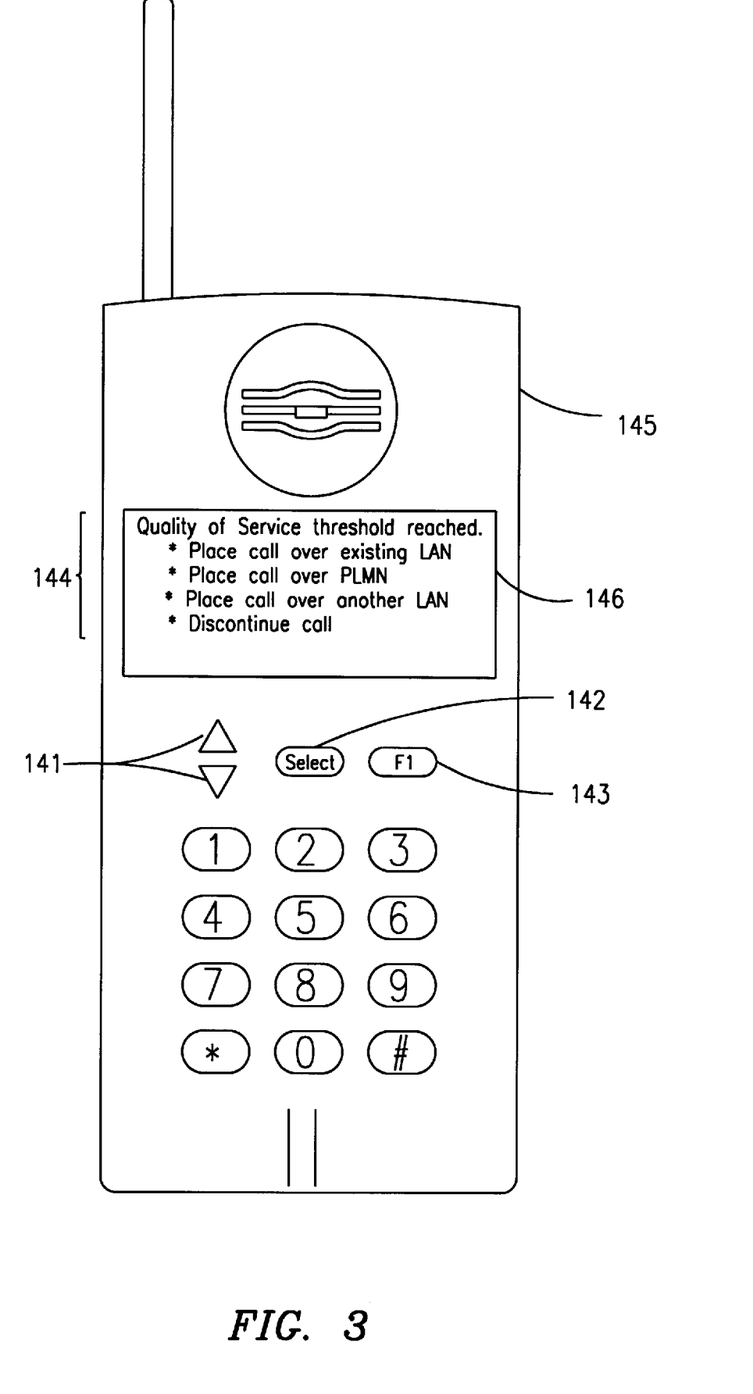
FIG. 3 shows a sample display of network options on a mobile station in accordance with embodiments of the present invention.

As an example, as shown in FIG. 3 of the drawings, the prompt message 144 on the display 146 can read "Quality of Service threshold reached. *Place call over existing LAN; *Place call over PLMN; *Place call over another LAN; *Discontinue call." The mobile subscriber can then use the up and down arrow keys 141 and the select key 142 or other function key(s) 143 on the MS 145 to select the option for that call.

Figure 4:
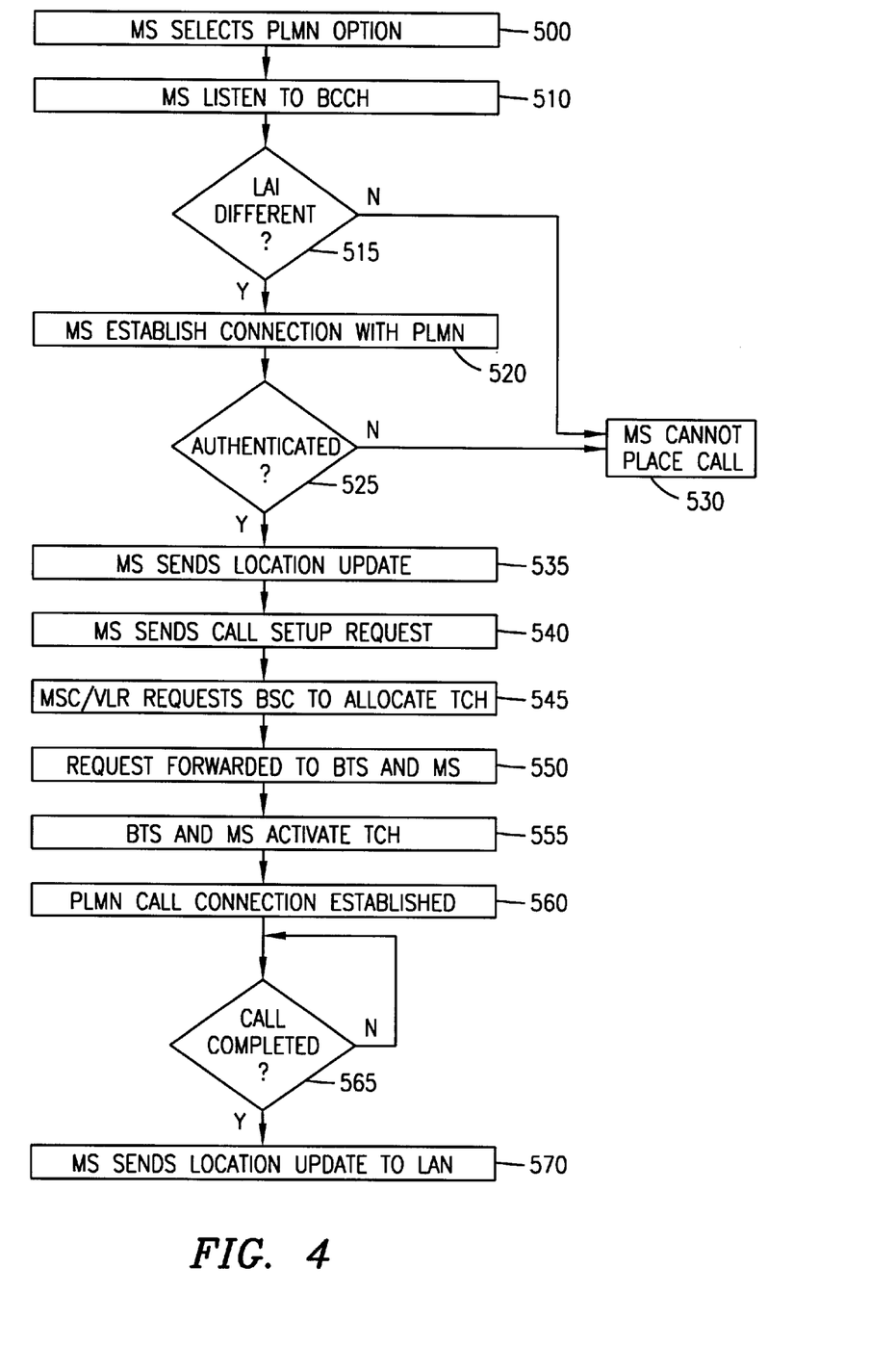
FIG. 4 shows steps in a sample selection of the Public Land Mobile Network (PLMN) for completion of an outgoing wireless call in accordance with embodiments of the present invention.
Figure 5:
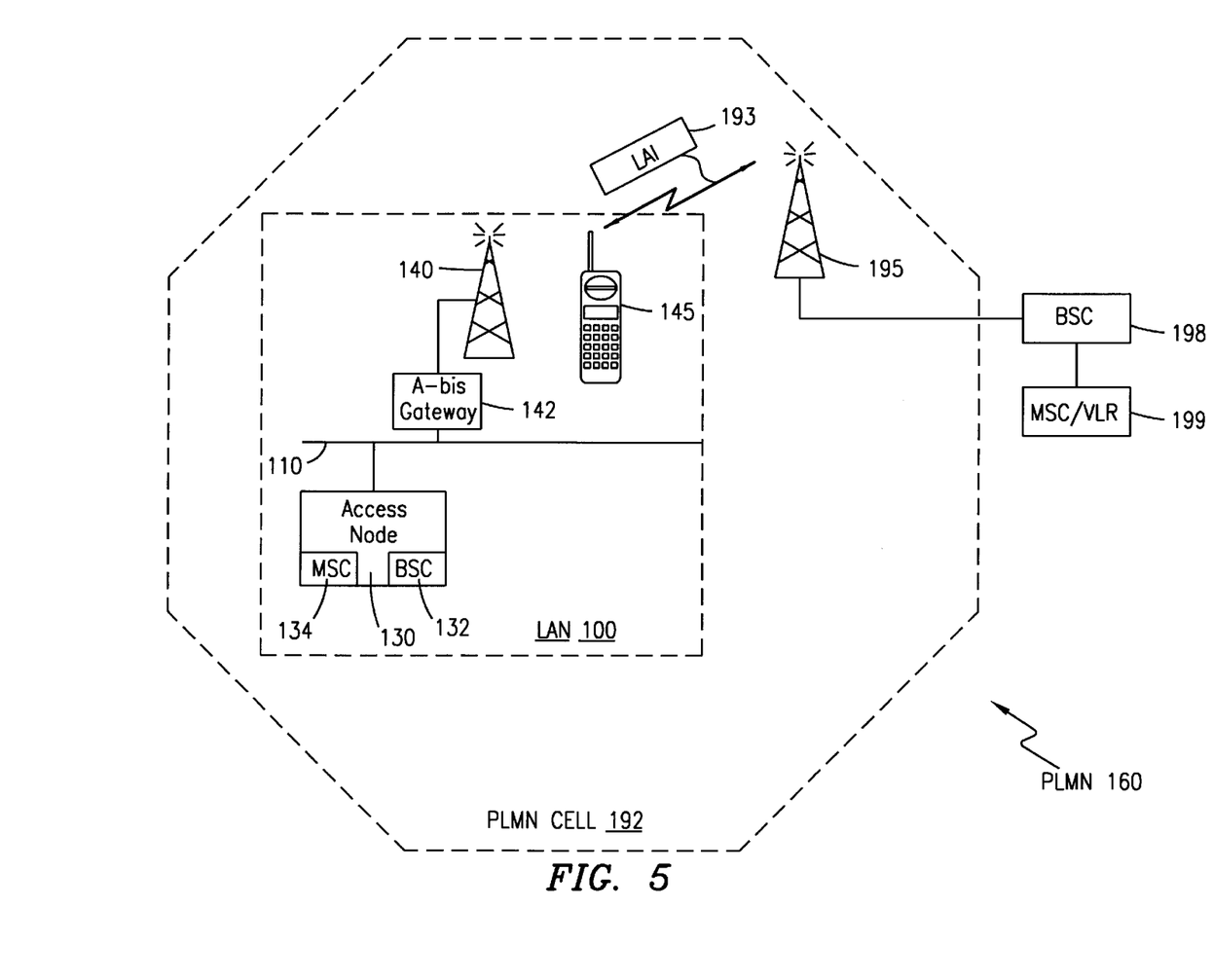
FIG. 5 illustrates the selection of the PLMN in accordance with the steps shown in FIG. 4.

With reference now to the steps shown in FIG. 4 of the drawings, which will be discussed in connection with FIG. 5 of the drawings, if, for example, the mobile subscriber selects the option for placing the call over the PLMN 160 (step 500), the MS 145 would then listen to the Broadcast Control Channel (BCCH) of an overlapping cell 192 of the PLMN 160 (step 510), which broadcasts the Location Area Identity (LAI) 193, which identifies one Location Area (LA) of an area served by an MSC/VLR 199. The MS 145 can compare the received LAI 193 with the last LAI received for the IP based LAN network 100 to determine that the most recently received LAI 193 belongs to another network (step 515), such as the PLMN 160 or another LAN (not shown). The MS 145 can then establish a connection with the PLMN 160 via a Stand-Alone Dedicated Control Channel (SDCCH) (step 520). However, if the LAI 193 is not different from the last LAI received for the IP based LAN 100 (step 515), the MS 145 cannot place the call over the PLMN 160 (step 530). This can occur, for example, when the MS 145 is not in a location where there is an overlapping PLMN cell 192.

Once the MS 145 establishes a connection with the PLMN 160 via the SDCCH (step 520), the MSC/VLR 199 serving the umbrella cell 192 that the MS 145 is located in performs authentication of the MS 145 (step 525). If authentication is successful (step 525), the MS 145 sends a Location Updating Request to the MSC/VLR 199 (step 535), which then updates the Home Location Register (HLR) (not shown) with the new PLMN MSC/VLR 199 information. However, it should be noted that if authentication is not successful (step 525), the MS 145 cannot place the call over the PLMN 160 (step 530).

After the location update (step 535), the MS 145 can establish a call connection via the PLMN MSC/VLR 199 by sending a call setup request to the PLMN MSC/VLR 199 via the SDCCH (step 540). The PLMN MSC/VLR 199 then requests a BSC 198 serving the umbrella cell 192 to allocate a free traffic channel (TCH) (step 545). This request is then forwarded to a BTS 195 serving the umbrella cell 192 and to the MS 145 (step 550) to activate the allocated traffic channel (step 555). Thereafter, the PLMN 160 call connection can be established for the MS 145 (step 560). After completion of the call (step 565), the MS 145 can automatically revert back to the IP based LAN 100 in order to receive messages and other incoming calls by performing another location update to the MSC functionality 134 within the AN 130 (step 570).

Figure 6:
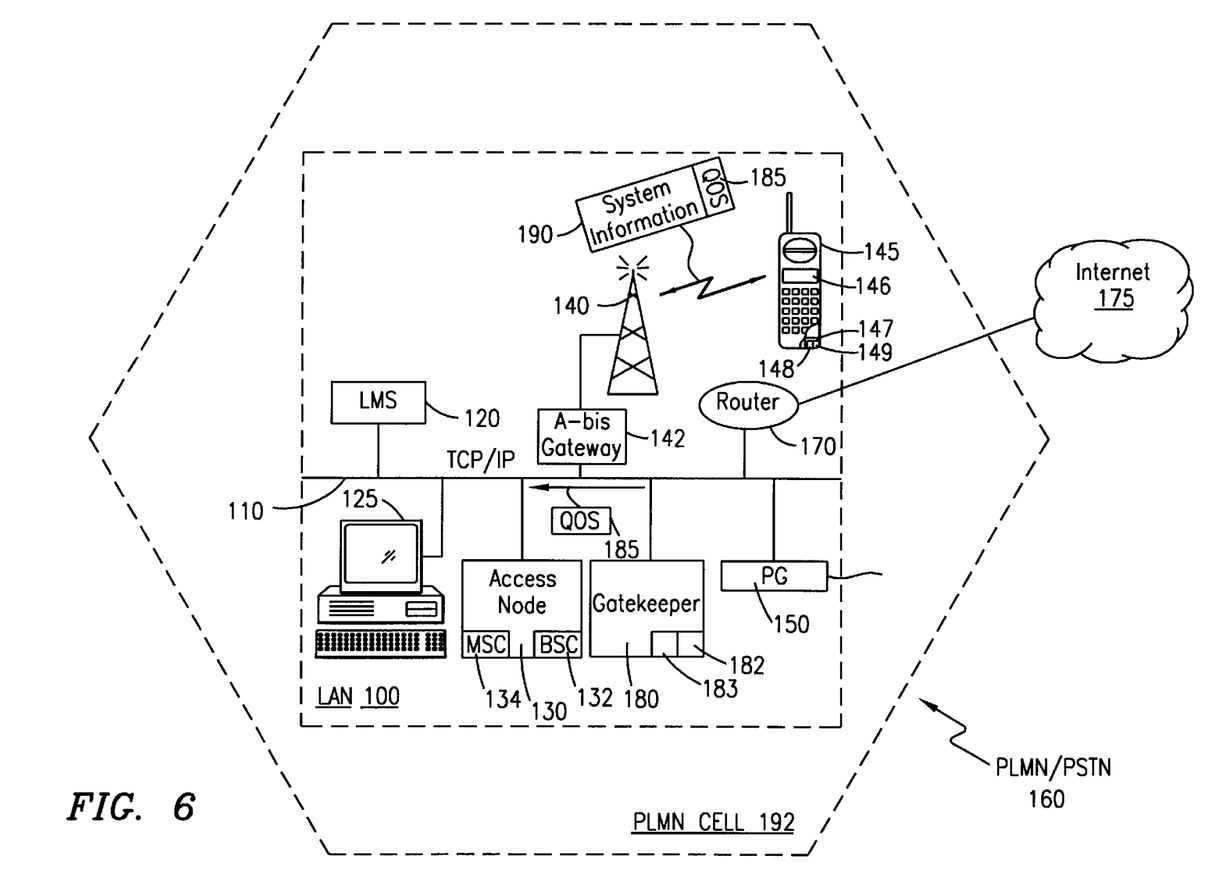
FIG. 6 depicts the determination of whether adequate quality of service exists on a local area network by the local area network and the transmission of this determination to a mobile station for aid in deciding whether to place a call on the local area network in accordance with embodiment of the present invention.

In an alternative embodiment of the present invention, as shown in FIG. 6 of the drawings, the network operator for the IP based LAN 100 can establish a QOS threshold value 182 and store it within, for example, the gatekeeper 180. This parameter 182 determines the threshold at which the QOS 185 is transmitted on the air interface to the MS 145. An application 183 within the gatekeeper 180 can compare the QOS 185 with the threshold QOS 182, and if the QOS 185 surpasses the threshold 182, the application 183 can pass the QOS parameter 185 to the BSC functionality 132 within the AN 130 via the MSC functionality 134 within the AN 130. The BSC functionality 132 within the AN 130 can then broadcast the QOS value 185 to the MS 145 on the System Information message 190 via the BTS 140.

When the MS 145 receives the QOS parameter 185, the MS 145 can either select that a call shall be placed on the traditional PLMN network 160 or on another LAN instead of the IP based LAN 100 or display the QOS 185 to the mobile subscriber and allow the mobile subscriber to select either the IP based LAN 100, the PLMN 160 or another LAN, if available, as discussed hereinbefore. It should be understood that the MS 145 can also have a QOS threshold 148 stored in a memory 147 therein, which is compared, using a comparison application 149, to the broadcasted QOS 185 before the MS 145 either displays the results to the mobile subscriber or selects the PLMN 160 or another LAN, as discussed hereinbefore.

In still another alternative embodiment, the application 183 within the gatekeeper 180 can compare the QOS value 185 with the stored QOS threshold 182 and send to the BSC functionality 132 within the AN 130, instead of the QOS value 185, either a QOS (high) or QOS (low) indicator (not shown). This indicator can then be transmitted on the System Information message 190 to the MS 145. The MS 145 can then determine whether to place the call through the IP based LAN 100 or through the PLMN 160 or another LAN, depending upon whether the QOS indicator is low or high, respectively. This information can also be displayed to the mobile subscriber to allow the mobile subscriber to make the decision. However, in this embodiment, the MS 145 would not store a separate QOS threshold value 148, as the actual QOS value 185 is not transmitted to the MS 145.

Figure 7:
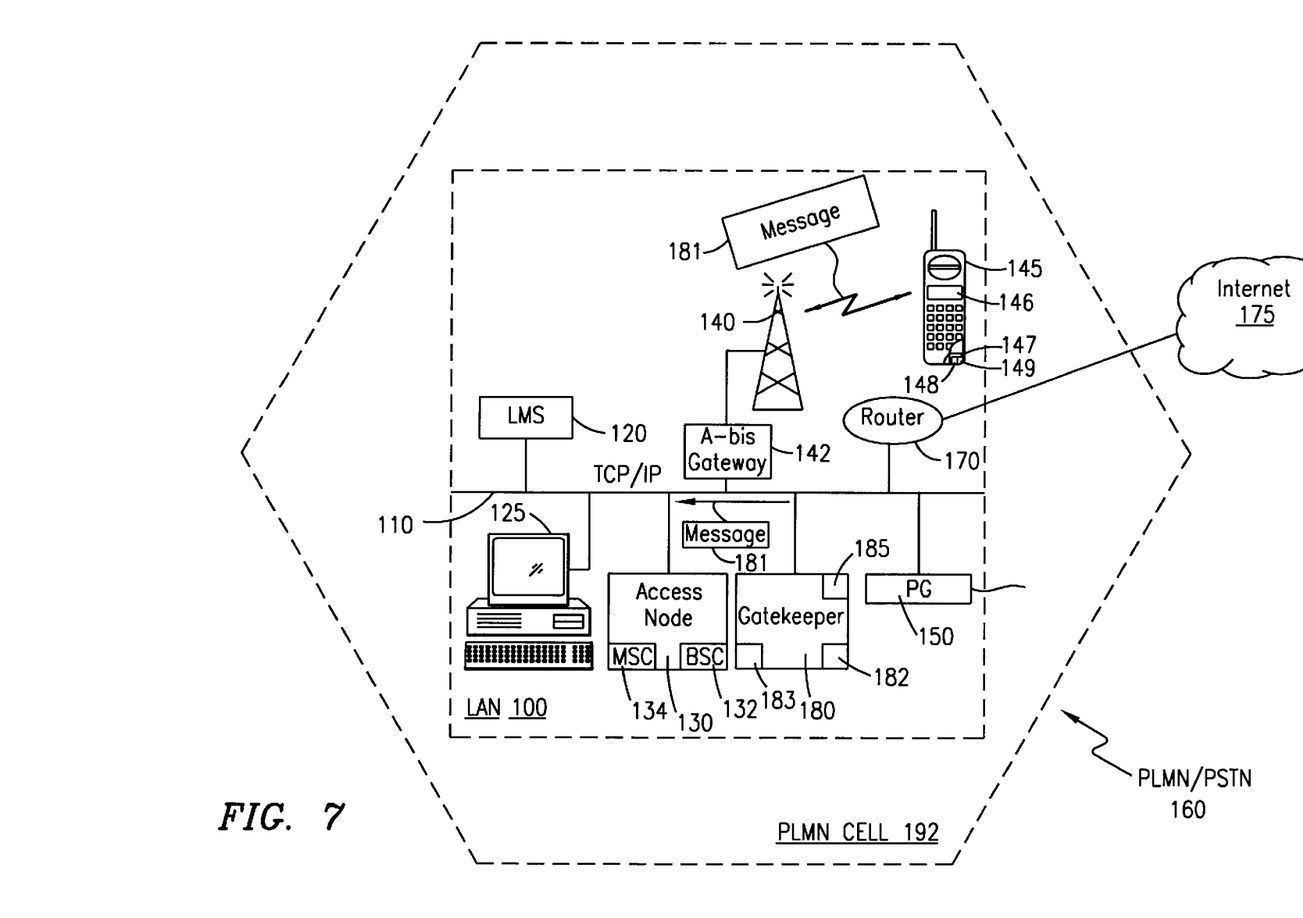
FIG. 7 illustrates the use of quality of service information to differentiate charging within a local area network based wireless telecommunications system in accordance with embodiment of the present invention.

In still a further alternative embodiment, as shown in FIG. 7 of the drawings, when the IP based LAN 100 is almost idle, e.g., the amount of allocated bandwidth is low, the network operator can use the QOS parameter 185 in the wireless environment to differentiate charging for wireless calls on the IP based LAN 100. In this embodiment, the application 183 within the gatekeeper 180 can obtain the QOS value 185 and determine an optimum message 181 to be sent to the MS 145 by short message or other type of message. For example, if the QOS 185 is between two established thresholds 182, the application 183 within the gatekeeper 180 can instruct the BSC functionality 132 within the AN 130 to broadcast to the MS 145 that all calls placed over the IP based LAN 100 are currently charged at a 10% discounted rate. This may encourage the mobile subscriber to place a call while connected to the IP based LAN 100, instead of waiting to place the call until the MS 145 has roamed into another MSC/VLR service area (not shown).

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A local area network based wireless telecommunications system, comprising:
   a traffic node for monitoring an amount of allocated bandwidth on said local area network and generating a quality of service parameter dependent thereon;

at least one mobile station storing a quality of service threshold therein, said at least one mobile station further having therein means for selecting one of a plurality of networks to place a call on based upon said quality of service parameter, said means for selecting comparing said received quality of service parameter with said quality of service threshold and selecting said local area network for said call when said received quality of service parameter is below said quality of service threshold; and a base station system in wireless communication with said plurality of mobile stations, said traffic node sending said quality of service parameter to said base station system, said base station system broadcasting said quality of service parameter to said plurality of mobile stations.

2. The telecommunications system of claim 1, wherein said traffic node is a gatekeeper.

3. The telecommunications system of claim 1, wherein said base station system comprises:

base station controller functionality within an access node associated with said local area network; and a base transceiver station.

4. The telecommunications system of claim 3, further comprising:

mobile switching center functionality within said access node in communication with said base station controller functionality.

5. The telecommunications system of claim 4, wherein said traffic node sends said quality of service parameter to said base station controller functionality via said mobile switching center functionality.

6. The telecommunications system of claim 5, wherein said base station controller functionality transmits said quality of service parameter to said at least one mobile station over a System Information message via said base transceiver station.

7. The telecommunications system of claim 1, wherein said quality of service parameter comprises the percentage of the total bandwidth allocated.

8. The telecommunications system of claim 7, wherein said comparison means instructs said at least one mobile station to display options on a display of said at least one mobile station when said receded quality of service parameter is above said stored quality of service threshold.

9. The telecommunications system of claim 8, wherein said options comprise a list of alternative networks to use in placing said call.

10. The telecommunications system of claim 9, wherein said means for selecting is responsive to an input based upon said list provided by a mobile subscriber associated with said at least one mobile station.

11. The telecommunications system of claim 10, wherein said at least one mobile station further comprises:

at least one function key to provide said input.

12. The telecommunications system of claim 1, wherein said traffic node stores a quality of service threshold value therein, said traffic node comparing said quality of service parameter with said quality of service threshold value, said quality of service parameter being transmitted to said at least one mobile station when said quality of service parameter exceeds said quality of service threshold value.

13. The telecommunications system of claim 1, wherein said quality of service parameter comprises: a first value and a second value.

14. The telecommunications system of claim 1, wherein said traffic node derives charging information from said quality of service parameter, said charging information being broadcast to said plurality of mobile stations.

15. The telecommunications system of claim 1, wherein said plurality of networks comprises: said local area network and at least one of a Public Land Mobile Network and an additional local area network.

16. A method for allowing a plurality of mobile stations to select one of a plurality of networks to use for placing calls based upon quality of service information, said method comprising the steps of monitoring, by a traffic node associated with a local area network based wireless telecommunications system, an amount of allocated bandwidth on said local area network;

generating, by said traffic node, a quality of service parameter based upon the amount of allocated bandwidth;

broadcasting said quality of service parameter to a given one of said plurality of mobile stations from a base station system associated with said local area network;

selecting, by said given mobile station, a network to place a call on using said quality of service parameter; and placing, by said given mobile station, said call within said local area network when said received quality of service parameter is below said quality of service threshold.

17. The method of claim 16, wherein said base station system comprises base station controller functionality within an access node associated with said local area network and a base transceiver station, said access node having mobile switching center functionality therein, and further comprising the step of:

sending, by said traffic node, said quality of service parameter to said bass station controller functionality within said access node via said mobile switching center functionality within said access node.

18. The method of claim 17, wherein said step of broadcasting is performed by said base station controller functionality transmitting said quality of service parameter to said given mobile station over a System Information message via said base transceiver station serving said mobile station.

19. The method of claim 16, wherein said step of selecting further comprises the steps of:

storing, by said given mobile station, a quality of service threshold in a memory therein; and comparing, by said given mobile station, said received quality of service parameter with said stored quality of service threshold.

20. The method of claim 19, wherein said step of selecting further comprises the step of:

displaying a list of alternative networks to use in placing said call on a display of said given mobile station when said received quality of service parameter is above said stored quality of service threshold.

21. The method of claim 20, wherein said selected network is one of said displayed alternative networks, and further comprising the step of:

establishing, by said given mobile station, a connection with said selected alternative network in order to place said call.

22. The method of claim 16, wherein said step of broadcasting further comprises the steps of:

storing, within said traffic node, a quality of service threshold value;

comparing, by said traffic node, said quality of service parameter with said quality of service threshold value; and broadcasting said quality of service parameter when said quality of service parameter exceeds said quality of service threshold value.

23. A traffic node within a local area network based wireless telecommunications system, comprising:

a memory for storing a quality of service threshold value therein;

means for monitoring an amount of allocated bandwidth on said local area network;

means for generating a quality of service parameter based upon the amount of allocated bandwidth;

means for comparing said quality of service parameter with said quality of service threshold value; and means for sending said quality of service parameter to a base station system within said local area network for transmission of said quality of service parameter over an air interface when said quality of service parameter exceeds said quality of service threshold value.

* * * * *